US012250358B2

(12) United States Patent
Baba et al.

(10) Patent No.: US 12,250,358 B2
(45) Date of Patent: Mar. 11, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Naoko Baba, Kanagawa (JP); Yuji Konno, Kanagawa (JP); Yoshitomo Marumoto, Kanagawa (JP); Shin Genta, Kanagawa (JP); Takayuki Ushiyama, Chiba (JP); Yumi Shimokodachi, Kanagawa (JP); Serena Yoshikawa, Kanagawa (JP); Taichi Yokokawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/149,097

(22) Filed: Dec. 31, 2022

(65) Prior Publication Data
US 2023/0137887 A1    May 4, 2023

Related U.S. Application Data

(63) Continuation of application No. 17/226,828, filed on Apr. 9, 2021, now Pat. No. 11,553,111.

(30) Foreign Application Priority Data

Apr. 14, 2020 (JP) .................................. 2020-072152
Jan. 27, 2021 (JP) .................................. 2021-010862

(51) Int. Cl.
*H04N 1/60* (2006.01)
*H04N 1/00* (2006.01)

(52) U.S. Cl.
CPC ....... *H04N 1/6094* (2013.01); *H04N 1/00588* (2013.01); *H04N 1/6025* (2013.01)

(58) Field of Classification Search
CPC . H04N 1/6094; H04N 1/00588; H04N 1/6025
USPC ............................................. 358/1.9
See application file for complete search history.

(56) References Cited

U.S. PATENT DOCUMENTS

| 11,553,111 | B2* | 1/2023 | Baba | H04N 1/6025 |
| 2011/0149319 | A1* | 6/2011 | Muto | H04N 1/6033 358/1.9 |
| 2012/0188596 | A1 | 7/2012 | Niles | |
| 2014/0293300 | A1 | 10/2014 | Teraue | |
| 2016/0330349 | A1 | 11/2016 | Hashimoto | |
| 2020/0271437 | A1* | 8/2020 | Kim | G01B 11/02 |

FOREIGN PATENT DOCUMENTS

| JP | 2004167947 A | | 6/2004 | |
| JP | 2010039477 A | * | 2/2010 | ........... G03G 15/169 |
| JP | 4 831206 B2 | | 12/2011 | |
| JP | 2020163772 A | | 10/2020 | |

* cited by examiner

*Primary Examiner* — Gabriel I Garcia
(74) *Attorney, Agent, or Firm* — Canon U.S.A., Inc. IP Division

(57) ABSTRACT

An information processing apparatus, an information processing method, and a storage medium that execute density characteristics acquisition processing at an appropriate timing are provided.

22 Claims, 12 Drawing Sheets

FIG.4
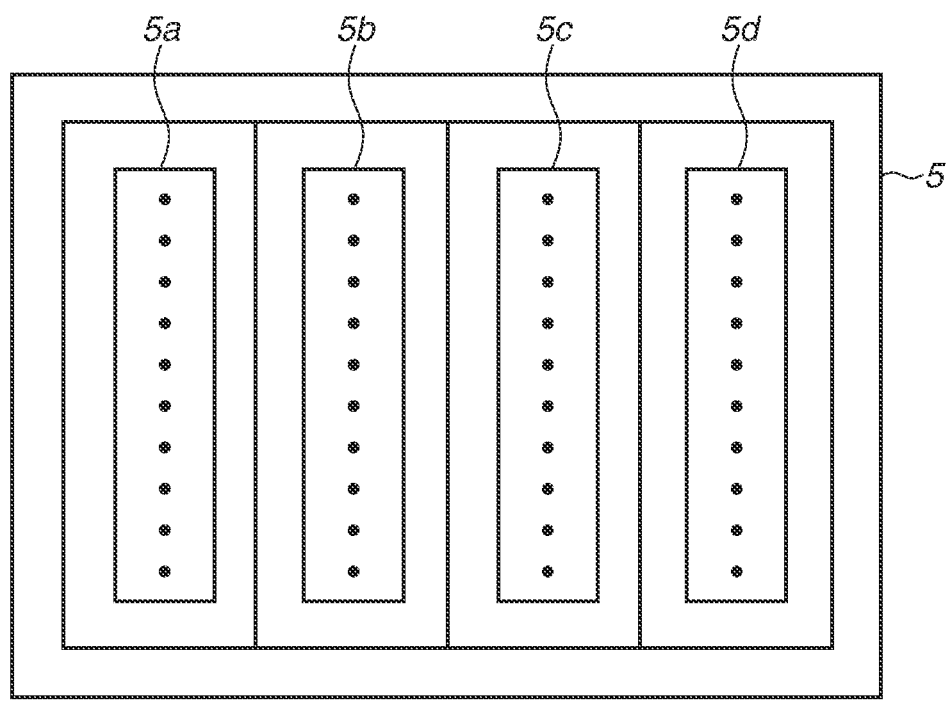
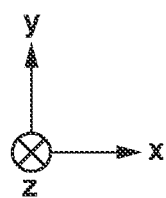

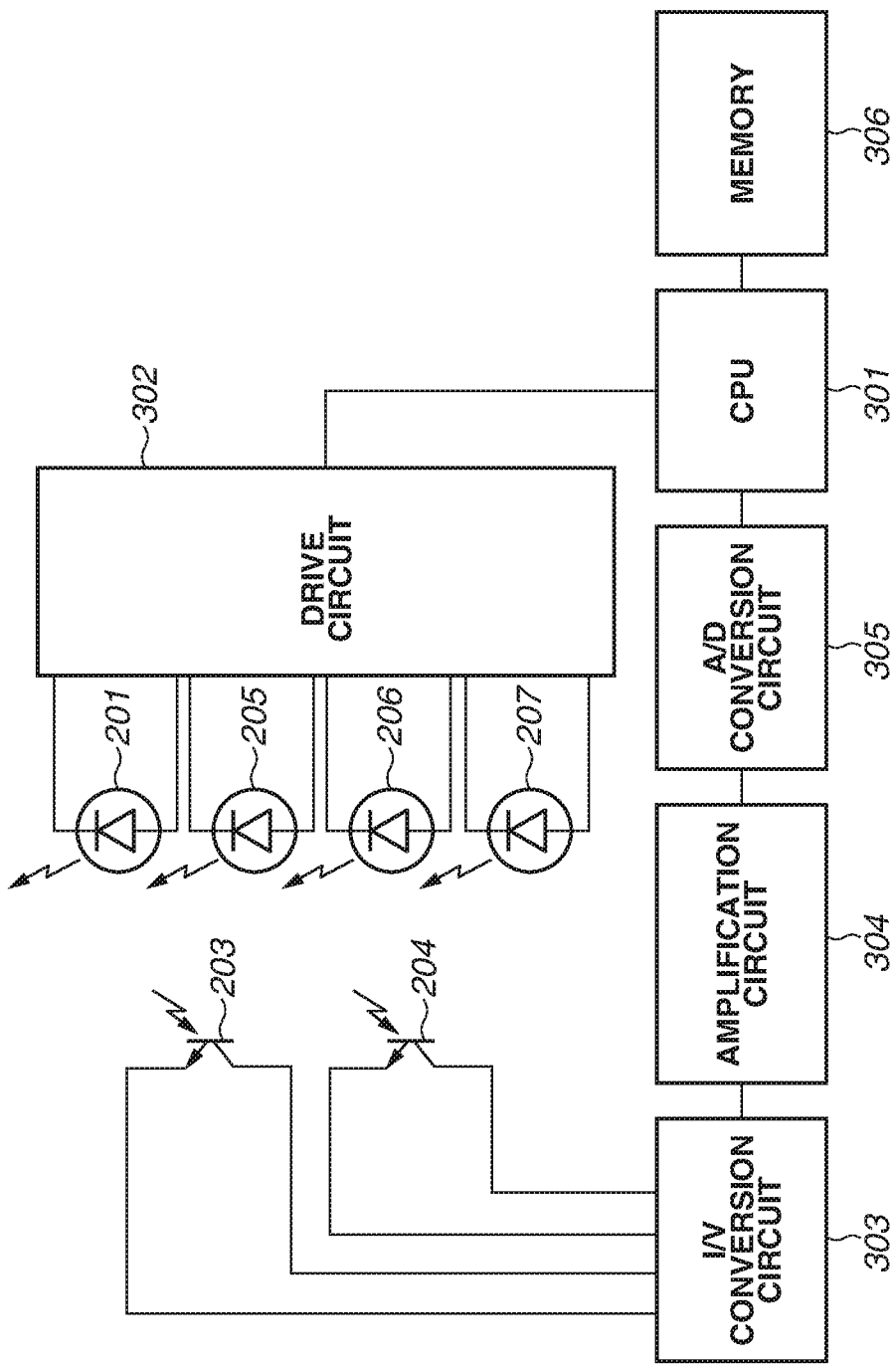

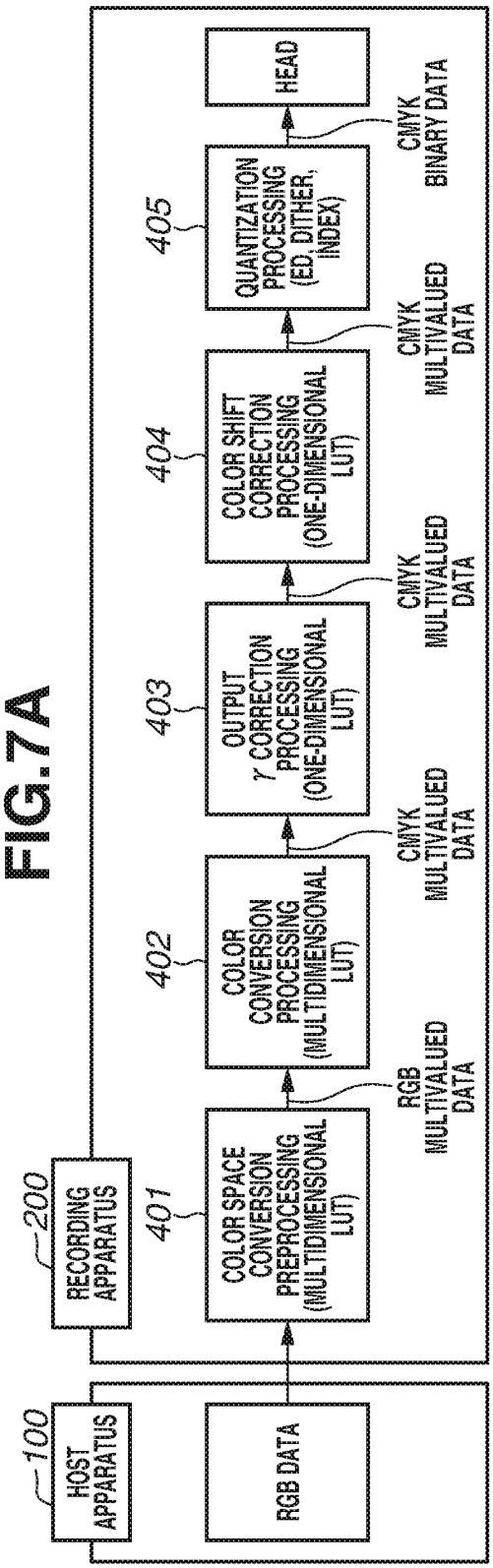

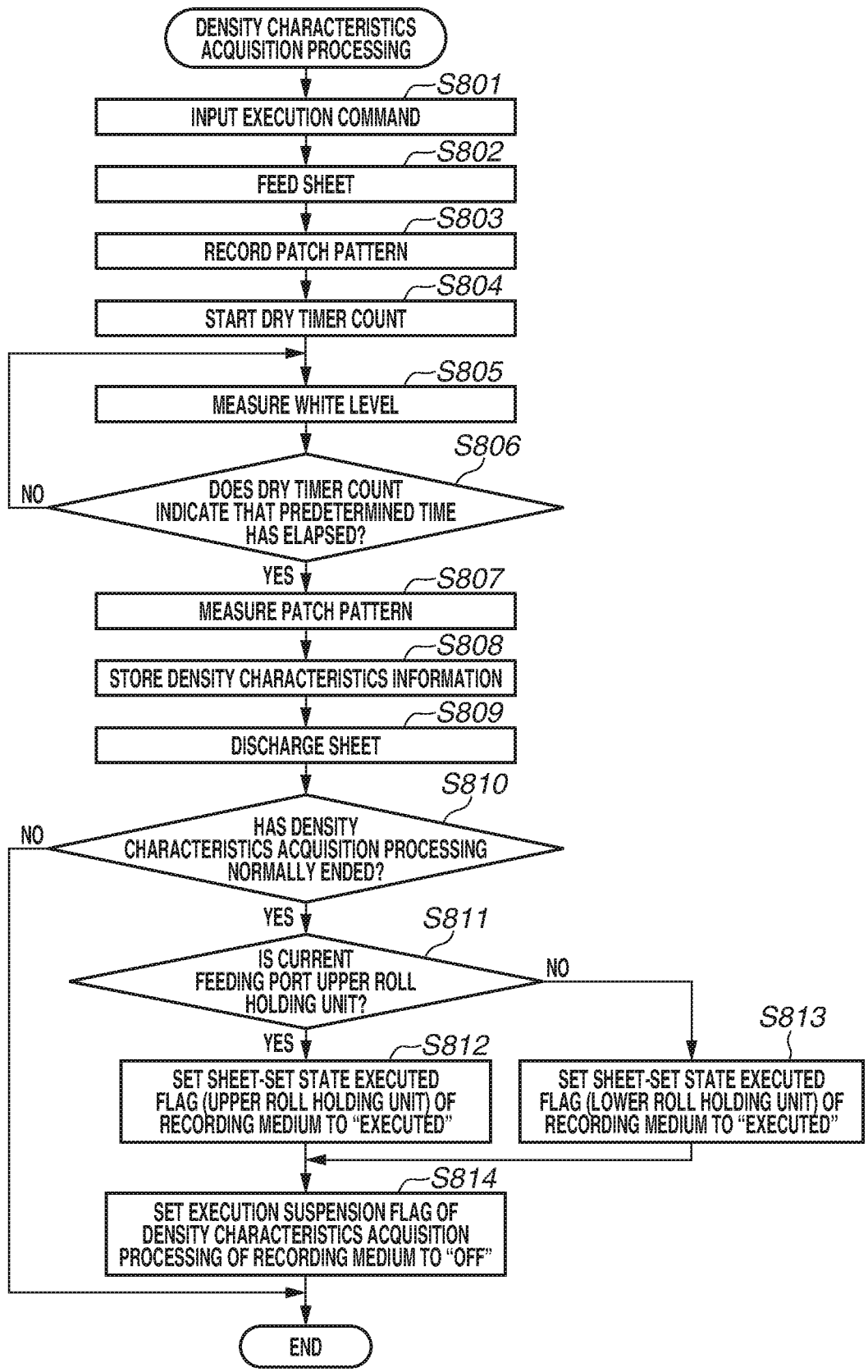

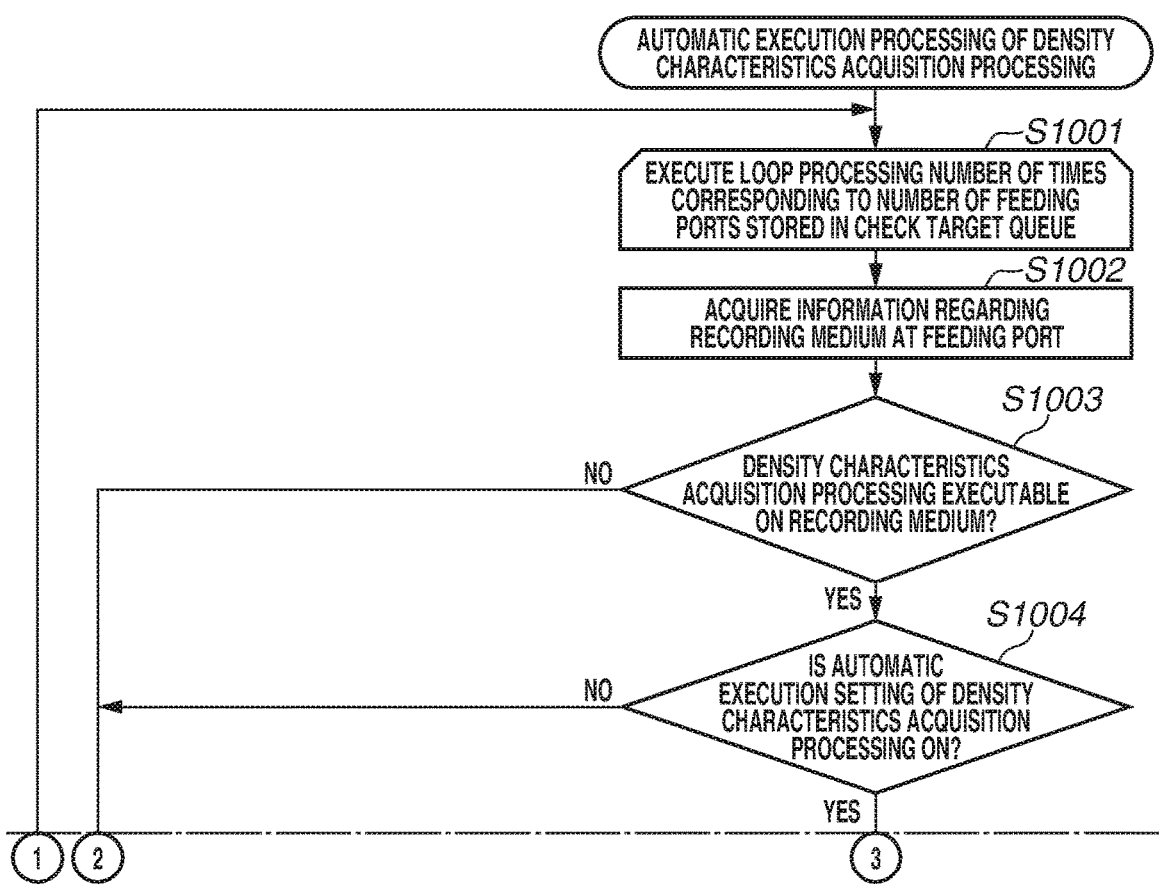

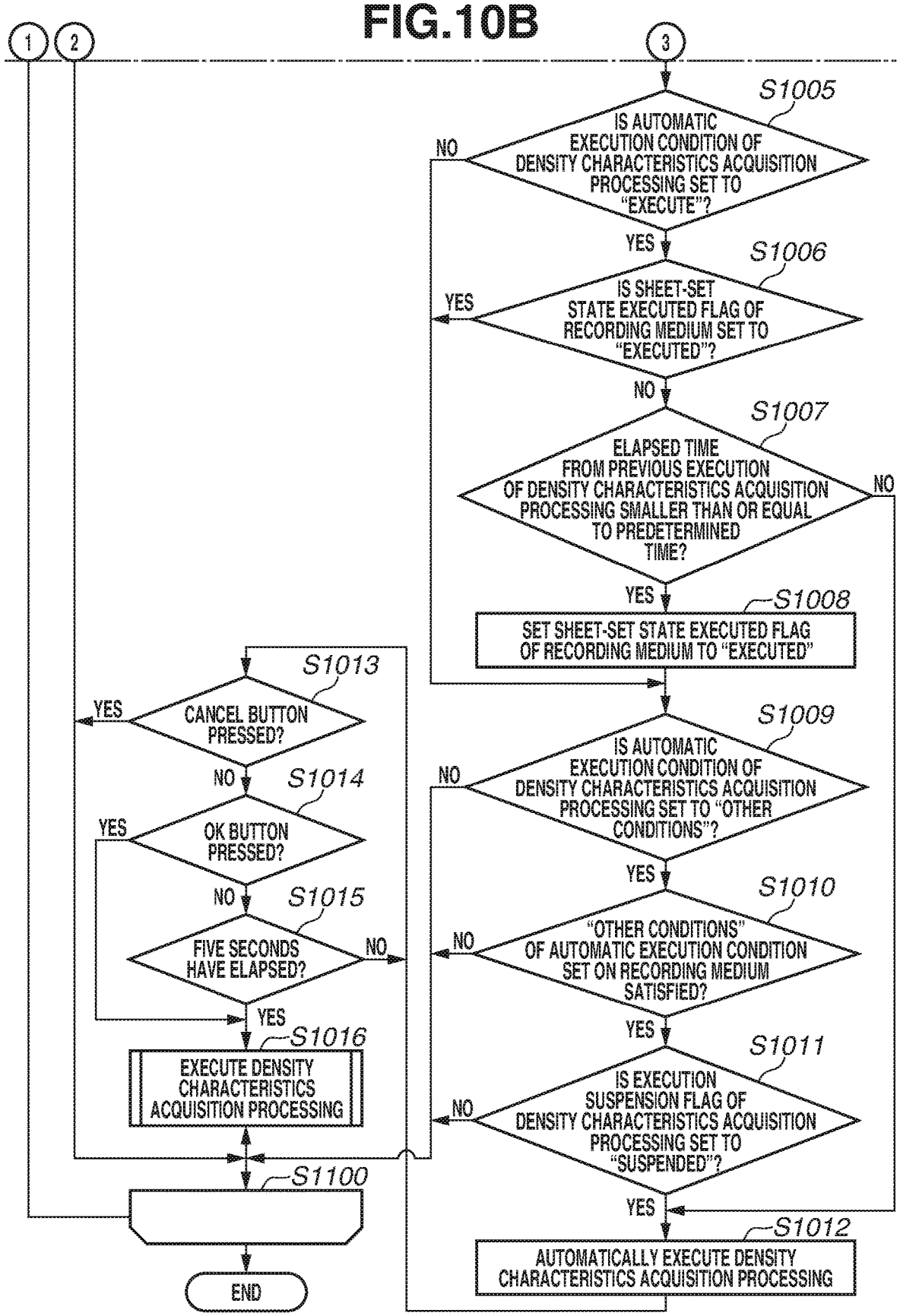

INFORMATION PROCESSING APPARATUS, INFORMATION PROCESSING METHOD, AND STORAGE MEDIUM

CROSS-REFERENCE TO RELATED APPLICATION

This application is a Continuation of U.S. application Ser. No. 17/226,828, filed Apr. 9, 2021 which claims priority from Japanese Patent Application No. 2020-072152, filed Apr. 14, 2020, and Japanese Patent Application No. 2021-010862, filed Jan. 27, 2021, which is hereby incorporated by reference herein in its entireties.

BACKGROUND OF THE INVENTION

Field of the Invention

The present invention relates to an information processing apparatus, an information processing method, and a storage medium.

Description of the Related Art

Conventional output devices that record images onto recording media such as recording sheets include recording apparatuses that record images by applying recording materials. As one of such recording apparatuses, there has been known an inkjet recording apparatus that records an image by applying ink from a recording head including a plurality of recording elements.

In such an inkjet recording apparatus, manufacturing errors and individual differences of recording heads cause a difference in recording characteristics. Due to the difference in recording characteristics, an image desired by a user is not obtained in some cases. For example, in the case of a recording head that injects ink droplets from a nozzle, a difference in injection characteristics between recording heads or nozzles causes a density difference in an image to be recorded. The difference in recording characteristics is caused not only by manufacturing errors but also by a variation in recording characteristics of each recording element attributed to aging, or a variation in ink viscosity attributed to a usage environment. As a technique for dealing with such a difference in recording characteristics, a technique of adjusting the color hue of an image by performing correction processing has been known.

For example, Japanese Patent Application Laid-Open No. 2004-167947 discusses a technique of printing correction image data including a sample image with a plurality of gradations for each ink color, and calculating a density correction value of each gradation of each ink color based on a printing result of the sample image.

On the other hand, when density characteristics acquisition processing for correction is performed, recording sheets and ink for recording a test pattern are necessary. For this reason, the recording sheets and ink may be consumed excessively depending on execution frequency of the density characteristics acquisition processing for correction. In view of such an issue, the present invention is directed to an information processing apparatus, an information processing method, and a storage medium that determine execution of the density characteristics acquisition processing at an appropriate timing.

SUMMARY OF THE INVENTION

According to an aspect of the present invention, an information processing apparatus includes a memory configured to store, in response to execution of a feeding operation of feeding a recording medium held by a holding member to a predetermined sheet feeding position, a setting indicating whether to execute characteristics acquisition processing for acquiring recording characteristics of a recording unit, an acquisition unit configured to acquire sheet-fed information indicating that the feeding operation has been executed, and a determination unit configured to determine execution of the characteristics acquisition processing in response to acquisition of the sheet-fed information in a case where the setting indicates that the characteristics acquisition processing is to be executed in response to execution of the feeding operation.

Further features of the present invention will become apparent from the following description of exemplary embodiments with reference to the attached drawings.

BRIEF DESCRIPTION OF THE DRAWINGS

FIG. 4 is a diagram illustrating an injection port surface on which injection ports of a recording head are arranged.

FIG. 6 is a schematic diagram illustrating a control circuit that processes input/output signals of the multipurpose sensor.

FIGS. 7A and 7B are diagrams illustrating a procedure of image processing.

FIG. 8 is a flowchart illustrating density characteristics acquisition processing.

FIG. 10, which includes FIGS. 10A and 10B, is a flowchart illustrating an automatic execution processing of the density characteristics acquisition processing.

DESCRIPTION OF THE EMBODIMENTS

Hereinafter, an exemplary embodiment of the present invention will be described with reference to the drawings.

Figure 1:
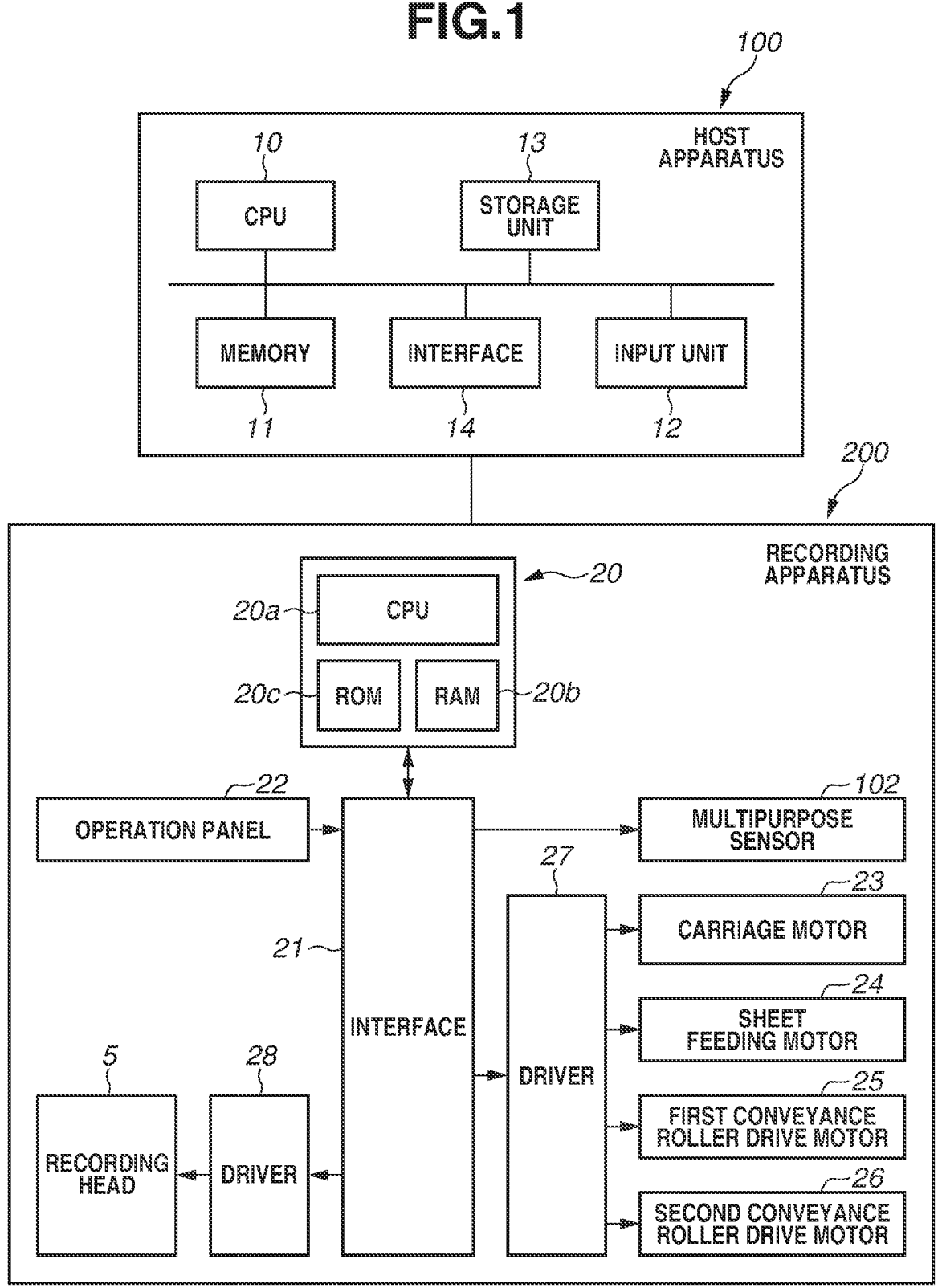
FIG. 1 is a block diagram illustrating a configuration of a recording system.

FIG. 1 is a block diagram illustrating a configuration of a recording system according to a first exemplary embodiment. A host apparatus 100 is an information processing apparatus such as a personal computer or a digital camera that is connected to a recording apparatus 200. The host apparatus 100 includes a central processing unit (CPU) 10, a memory 11, a storage unit 13, an input unit 12 such as a keyboard and a mouse, and an interface (I/F) 14 for communication with the recording apparatus 200. The CPU 10 executes various types of processing based on programs stored in the memory 11. The programs are supplied from an external device such as a compact disk read only memory (CD-ROM) and stored in the storage unit 13, or pre-stored in the storage unit 13.

The host apparatus 100 is connected with the recording apparatus 200 via the I/F 14, and transmits recording data represented in a red, green, and blue (RGB) format in an image processing process to be described below, to the recording apparatus 200. Based on image processing information, such as an image processing table, held in a read-only memory (ROM) 20c, the recording apparatus 200 executes image processing such as color processing or binarization processing, and correction processing of recording characteristics according to the present exemplary embodiment, which will be described below. Further, the recording apparatus 200 records an image on a recording medium based on recording data having been subjected to the image processing.

A control unit 20 of the recording apparatus 200 includes a CPU 20a such as a microprocessor, and a memory such as a random access memory (RAM) 20b and the ROM 20c. The RAM 20b is used as a work area of the CPU 20a, and temporarily stores various types of data such as image data received from the host apparatus 100 and generated recording data. The ROM 20c stores control programs of the CPU 20a and various types of data such as parameters necessary for a recording operation. The ROM 20c also stores a program for density characteristics acquisition processing to be described below, and a program for determining whether to automatically execute the density characteristics acquisition processing. The RAM 20b stores patch pattern data for recording a patch pattern, and the ROM 20c stores a look-up table (LUT) to be described below with reference to FIGS. 7A and 7B. Whichever of the RAM 20b and the ROM 20c may store these pieces of data.

The control unit 20 performs processing of inputting and outputting data such as image data and parameters that are to be used in recording to and from the host apparatus 100 via an interface 21, and processing of inputting various types of information (e.g., the type of recording medium) from an operation panel 22. In addition, the control unit 20 outputs, via the interface 21, on and off signals for driving motors 23 to 26. Furthermore, the control unit 20 outputs an injection signal to a driver 28 and controls the driving for injecting ink droplets from a recording head 5.

The control system further includes the interface 21, the operation panel 22, a multipurpose sensor 102, and drivers 27 and 28. In accordance with an instruction from the CPU 20a, the driver 27 drives a carriage motor 23 for driving a carriage, a sheet feeding motor 24 for driving a sheet feeding roller, a first conveyance roller drive motor 25 for driving a first conveyance roller pair, and the second conveyance roller drive motor 26 for driving a second conveyance roller pair. The driver 28 drives the recording head 5 to be described below.

Figure 2:
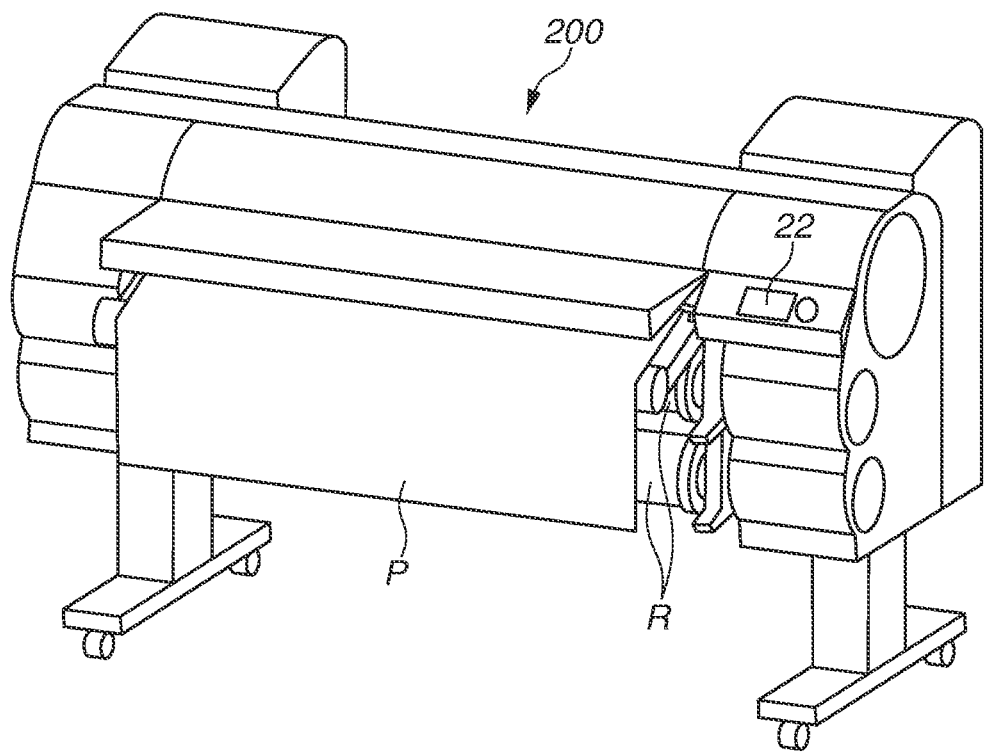
FIG. 2 is a schematic diagram illustrating a configuration and a recording operation of a recording apparatus.

FIG. 2 is a schematic diagram illustrating a configuration and a recording operation of the recording apparatus 200. The recording apparatus 200 can use a long continuous sheet (sometimes referred to as a web) as a recording medium. A roll sheet R is a rolled recording medium P. The recording apparatus 200 includes roll holding units (hereinafter, also referred to as feeding ports), to which the roll sheet R is set, disposed at two places at upper and lower positions. Then, an image is recorded by applying ink from the recording head 5 to the recording medium P selectively pulled out from a roll holding unit and fed up to a position facing the recording head 5.

Figure 3:
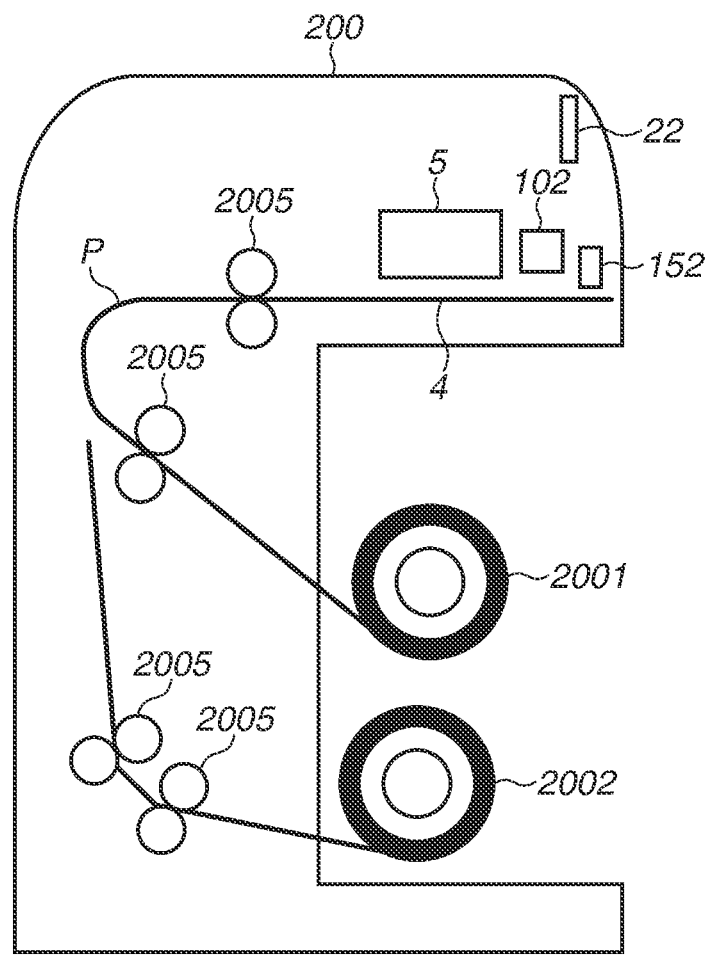
FIG. 3 is a cross-sectional schematic diagram of the recording apparatus.

FIG. 3 is a cross-sectional schematic diagram of the recording apparatus 200 according to the present exemplary embodiment. Herein, a conveyance direction at a position at which the recording head 5 faces the recording medium P is defined as a Y direction, and a direction in which a carriage on which the recording head 5 is mounted moves is defined as an X direction. On a conveyance path of the recording medium P, a direction toward a downstream side from an upstream side will be referred to as a conveyance direction.

For example, if the recording medium P is set around an upper roll sheet core 2001 and a feeding operation is executed, the recording medium P is pulled out from the upper roll sheet core 2001, conveyed by conveyance rollers 2005 along the conveyance path, and then guided to a sheet feeding position on a platen 4. The sheet feeding position is a position located on an upstream side in the conveyance direction of a recording position facing the recording head 5, and is a position at which recording can be started within a predetermined time after an image recording start instruction is received from the control unit 20. Feeding of the recording medium P may be started by a user issuing a feeding operation instruction to the recording apparatus 200 from the operation panel 22 after setting a roll sheet onto a roll holding unit. Alternatively, the feeding of the recording medium P may be automatically executed by the recording apparatus 200 guiding a leading end of the recording medium P to the conveyance path upon detecting a roll sheet set by the user in the roll holding unit. In the present exemplary embodiment, a state in which the recording medium P is conveyed up to the sheet feeding position by a feeding operation is defined as a state in which the recording medium P is fed. Alternatively, a state in which the leading end of the recording medium P is conveyed up to the recording position facing the recording head 5 may be determined as the state in which the recording medium P is fed.

The recording head 5 is mounted on the carriage (not illustrated). Image recording and scanning operations are performed by applying ink from the recording head 5 to the recording medium P while the carriage is moving in the X direction.

The recording apparatus 200 according to the present exemplary embodiment includes two roll holding units. If the recording medium P is set around a lower roll sheet core 2002 and a feeding operation is executed, the recording medium P is similarly pulled out from the lower roll sheet core 2002, conveyed by the conveyance rollers 2005 along the conveyance path, and then guided to the sheet feeding position on the platen 4.

Furthermore, a set recording medium can be switched. For example, if a feeding operation of the recording medium is executed on the lower roll holding unit in a state in which the recording medium set in the upper roll holding unit is fed to the sheet feeding position, first, the recording medium fed from the upper roll holding unit is rolled up and retracted. Next, the recording medium set in the lower roll holding unit is fed by the conveyance rollers 2005 to the sheet feeding position along the conveyance path. In this manner, the recording media in the upper roll holding unit and the lower roll holding unit can be switched.

When the recording medium P set around the upper roll sheet core 2001 or the lower roll sheet core 2002 is fed, the leading end of the recording medium P is moved upward by the conveyance rollers 2005 onto the platen 4. At this time, the multipurpose sensor 102 measures specular reflected light intensity, diffuse reflected light intensity, and the thickness of the recording medium P and the width of the recording medium P in a direction orthogonal to the conveyance direction. The recording medium P on which an image is recorded is cut by a cutter unit 152 into a length desired by the user.

When the recording medium P is fed, the type or the name of the fed recording medium P can be set as a "sheet name" or a "sheet type" in the recording apparatus 200 by using an input unit such as various switches provided on the operation panel 22. In the recording apparatus 200 according to the present exemplary embodiment, a plurality of types of pre-registered recording media is displayed on the operation panel 22, and the user is prompted to select a type of recording medium. The recording medium of the selected type is set as a type of recording medium to be fed now. The setting of the type may be performed before the feeding operation or may be performed after the feeding operation.

The recording apparatus 200 according to the present exemplary embodiment can also use a cut sheet in addition to the roll sheet. The recording apparatus 200 may include a sheet feeding tray (not illustrated) as a holding member for holding the cut sheet. Alternatively, if the recording apparatus 200 does not include a sheet feeding tray, the user may insert the cut sheet. In a configuration including the sheet feeding tray, the cut sheet held in the sheet feeding tray is fed. In a configuration not including the sheet feeding tray, the cut sheet can be inserted by lifting a lever (not illustrated) for releasing a nipping state of the conveyance rollers 2005, and the cut sheet is nipped by lowering the lever. In both cases, if the user designates "set" on the operation panel 22, and designates the "sheet name" or the "sheet type", the cut sheet is fed up to the sheet feeding position in a recording region.

If a feeding operation of the cut sheet is executed in the state in which the recording medium set in the upper roll holding unit or the lower roll holding unit is fed to the sheet feeding position, first, the recording medium in the upper roll holding unit or the lower roll holding unit is rolled up and retracted. Next, the set cut sheet is fed up to the sheet feeding position along the conveyance path.

The setting of the sheet name or the sheet type is not limited to the setting made by the user. The sheet type may be automatically determined and set using a sensor provided in the recording apparatus 200. Alternatively, the recording apparatus 200 may display candidates for the sheet type on the operation panel 22 based on information read by a sensor, and prompt the user to set the sheet type.

The term "feeding" generally refers to conveying the leading end of the recording medium set on the holding member up to the sheet feeding position. In processing to be described below herein with reference to FIG. 8, a state in which a recording medium is fed and the type of recording medium is set is determined to be a "sheet-set state".

The recording apparatus 200 according to the present exemplary embodiment can switch the set recording media to the cut sheet or the recording media set on the two roll holding units, irrespective of the sheet-set state. For example, if a recording instruction on the recording medium fed from the lower roll holding unit is issued in a state in which the recording medium set in the upper roll holding unit is fed to the sheet feeding position, first, the recording medium fed from the upper roll holding unit is rolled up and retracted. Next, the recording medium set in the lower roll holding unit is fed by the conveyance rollers 2005 up to the sheet feeding position along the conveyance path. In this manner, the recording media in the upper roll holding unit and the lower roll holding unit can be switched.

FIG. 4 is a diagram illustrating an injection port surface of the recording head 5 according to the present exemplary embodiment. Injection ports (hereinafter, also referred to as nozzles) for injecting ink are arranged on the injection port surface. The X direction in FIG. 4 is a scanning direction in which the recording head 5 moves, and the Y direction is a direction in which the recording medium is conveyed. The recording head 5 includes nozzle arrays 5a to 5d arranged in the X direction in FIG. 4. A plurality of nozzles is arrayed in each of the nozzle arrays 5a to 5d, and ink of a different type is supplied to each array. By driving a recording element such as a heating element provided in each of the nozzles, an ink droplet is injected from the corresponding nozzle. In the present exemplary embodiment, cyan (C) ink is supplied to the nozzle array 5a, magenta (M) ink is supplied to the nozzle array 5b, yellow (Y) ink is supplied to the nozzle array 5c, and black (K) ink is supplied to the nozzle array 5d. The number of ink colors and the number of nozzle arrays are not limited to these numbers.

Figure 5A:
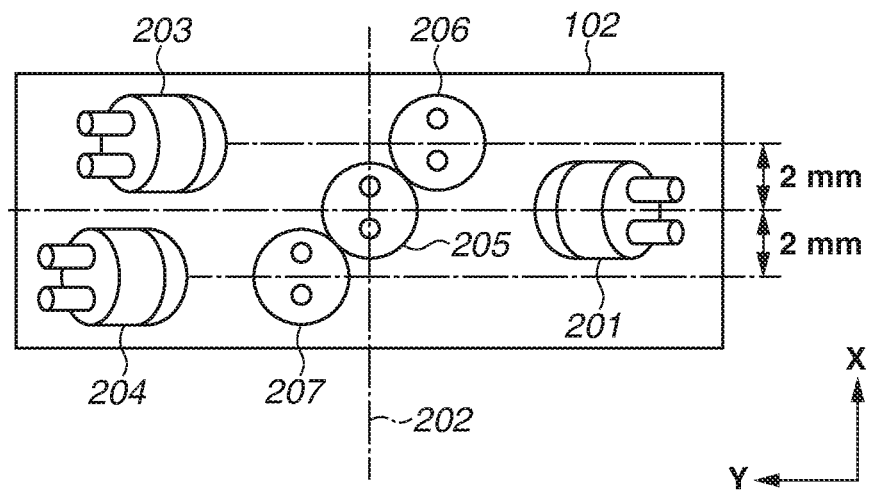
FIGS. 5A and 5B are configuration diagrams illustrating a multipurpose sensor.
Figure 5B:
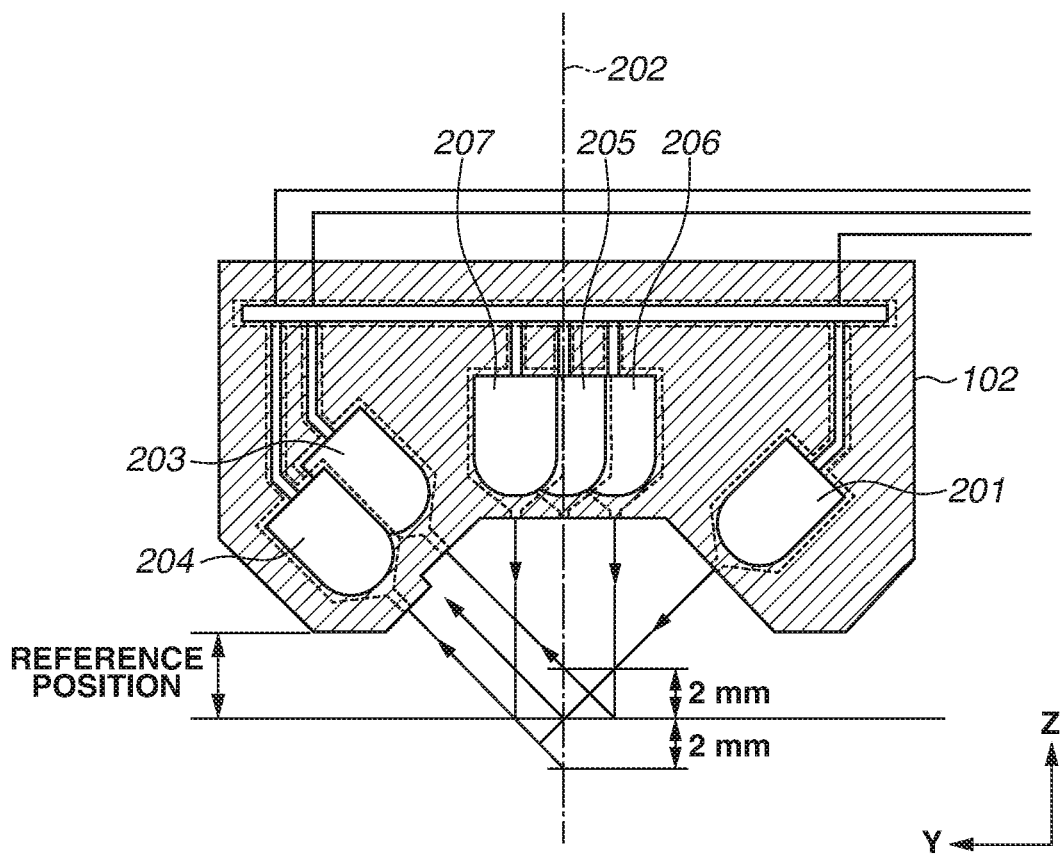

FIGS. 5A and 5B are configuration diagrams illustrating the multipurpose sensor 102. FIG. 5A is a plan view of the multipurpose sensor 102, and FIG. 5B is a cross-sectional view of the multipurpose sensor 102. The multipurpose sensor 102 according to the present exemplary embodiment performs measurement by moving in the X direction, similarly to the recording head 5. A measurement region of the multipurpose sensor 102 is located on a downstream side in the conveyance direction with respect to a recording surface of a scanning region in which the recording head 5 moves. The multipurpose sensor 102 is arranged in such a manner that the bottom surface of the multipurpose sensor 102 is located at the same position as the bottom surface of the recording head 5 or higher than the bottom surface of the recording head 5.

The multipurpose sensor 102 includes two phototransistors 203 and 204, three light-emitting diodes (LEDs) 205, 206, and 207, and one infrared LED 201, as optical elements. Each of the elements is driven by an external circuit (not illustrated). All of these elements are bullet-type elements (standard mass-produced type with a size of φ3.0 to 3.1 mm) having the maximum diameter of about 4 mm. In the present exemplary embodiment, a straight line connecting a central point of a range irradiated with irradiation light emitted from a light emitting element toward a measurement surface, and the center of the light emitting element will be referred to as an optical axis or an illumination axis of the light emitting element. The illumination axis also corresponds to the center of light flux of the irradiation light.

The infrared LED 201 has an irradiation angle of 45 degrees with respect to the surface (measurement surface) of the recording medium parallel to an XY-plane. The infrared LED 201 is arranged in such a manner that the illumination axis of the infrared LED 201, which corresponds to the center of the irradiation light, intersects a sensor central axis 202 parallel to a normal (Z-axis) of the measurement surface at a predetermined position. A position on the Z-axis of the intersection point (intersection) will be referred to as a reference position, and a distance from the sensor to the reference position will be referred to as a reference distance. The width of the irradiation light of the infrared LED 201 is adjusted by an opening portion, and is optimized to form an irradiated plane (irradiated region) with a diameter of about 4 to 5 mm on the measurement surface at the reference position.

The two phototransistors 203 and 204 have sensitivity to light with wavelengths from visible light to infrared light. When the measurement surface is at the reference position, the phototransistors 203 and 204 are installed in such a manner that their light receiving axes become parallel to a reflection axis of the infrared LED 201. More specifically, the phototransistor 203 is arranged in such a manner that the light receiving axis of the phototransistor 203 is located at a position shifted +2 mm in the X direction and +2 mm in a Z direction with respect to the reflection axis. In addition, the phototransistor 204 is arranged in such a manner that the light receiving axis of the phototransistor 204 is located at a position shifted −2 mm in the X direction and −2 mm in a Z direction. When the measurement surface is at the reference position, the measurement surface coincides with an intersection of illumination axes of the infrared LED 201 and the visible LED 205. In addition, light receiving regions of the two phototransistors 203 and 204 at the position are formed to sandwich the intersection. A spacer with a thickness of about 1 mm is interposed between the two elements in such a manner that light received by one element does not enter the other element. An opening portion is provided on a phototransistor side to restrict a light receiving range. The size of the opening portion is optimized in such a manner that only reflected light from a range of 3 to 4 mm in diameter of the measurement surface at the reference position can be received. In the present exemplary embodiment, on the measurement surface (measurement target surface), a line connecting a central point of a region (range) in which a light receiving element can receive light, and the center of the light receiving element is referred to as an optical axis or a light receiving axis of the light receiving element. The light receiving axis also corresponds to the center of light flux of the reflected light reflected on the measurement surface and received by the light receiving element.

In FIGS. 5A and 5B, the LED 205 is a single-color visible LED having a luminescence wavelength of green color (about 510 to 530 nm), and is installed to correspond to the sensor central axis 202. The LED 206 is a single-color visible LED having a luminescence wavelength of blue color (about 460 to 480 nm), and is arranged at a position shifted +2 mm in the X direction and −2 mm in the Y direction from the visible LED 205. Then, when the measurement surface is at the reference position, the LED 206 is arranged in such a manner that the illumination axis of the LED 206 intersects the light receiving axis of the phototransistor 203 at an intersection position of the illumination axis of the LED 206 and the measurement surface. Furthermore, the LED 207 is a single-color visible LED having a luminescence wavelength of red color (about 620 to 640 nm), and is arranged at a position away from the LED 205 by −2 mm in the X direction and +2 mm in the Y direction. When the measurement surface is at the reference position, the LED 207 is arranged in such a manner that the illumination axis of the LED 207 intersects the light receiving axis of the phototransistor 204 at an intersection position of the illumination axis of the LED 207 and the measurement surface.

FIG. 6 is a schematic diagram illustrating a control circuit that processes input/output signals of the multipurpose sensor 102. A CPU 301 outputs on and off control signals of the infrared LED 201 and the visible LEDs 205 to 207, and calculates output signals obtained depending on the light receiving amount of the phototransistors 203 and 204. A drive circuit 302 receives an on signal transmitted from the CPU 301, supplies constant current to each light emitting element to cause light emission, and adjusts a light emission amount of each light emitting element in such a manner that a light receiving amount of a light receiving element becomes a predetermined amount. A current-to-voltage (I/V) conversion circuit 303 converts output signals transmitted from the phototransistors 203 and 204 as current values into voltage values. An amplification circuit 304 amplifies an output signal converted into a voltage value, which is a weak signal, to an optimum level in analog-to-digital (A/D) conversion. An A/D conversion circuit 305 converts the output signal amplified by the amplification circuit 304 into a 10-bit digital value, and inputs the digital value to the CPU 301. A memory 306 is a nonvolatile memory and is used to record a look-up table for deriving a desired measurement value from a calculation result of the CPU 301 and to temporarily store an output value. The CPU 20a or the RAM 20b of the recording apparatus 200 may be used as the CPU 301 or the memory 306.

FIGS. 7A and 7B are diagrams each illustrating a procedure of image processing according to the present exemplary embodiment. FIG. 7A is a block diagram illustrating an image processing configuration in the recording apparatus 200, and FIG. 7B is a flowchart illustrating a procedure of image processing.

Eight-bit image data (luminance data) having 256 gradations for each color of red (R), green (G), and blue (B) is input from the host apparatus 100, and image processing is performed thereon. Then, finally, the image data is output as one-bit image data (recording data) indicating injection or non-injection of ink from each of the nozzles of C, M, Y, and K of the recording head 5. The types of colors and the number of gradations in the image data are not limited to these.

First, image data represented by R, G, and B multivalued luminance signals is input from the host apparatus 100. In step S401, using a multidimensional LUT 401, the input image data represented by the R, G, and B multivalued luminance signals is converted into R, G, and B multivalued data. The color space conversion preprocessing (hereinafter, also referred to as precedent color processing) is performed to correct a difference between a color space of the input image represented by R, G, and B image data in a recording target and a color space reproducible by the recording apparatus 200.

Next, in step S402, using a multidimensional LUT 402, data with R, G, and B colors that has been subjected to the precedent color processing is converted into multivalued data with C, M, Y, and K colors that are ink colors. The color conversion processing (hereinafter, also referred to as post-processing) is processing of converting input RGB image data represented by luminance signals into CMYK image data adapted to an output apparatus to represent the image data by a density signal.

Next, in step S403, using a one-dimensional LUT 403 corresponding to each color, output γ correction processing is performed on the multivalued data with C, M, Y, and K colors that has been subjected to the post-processing. Normally, the number of dots to be recorded per unit area of a recording medium and recording characteristics such as reflected density obtained by measuring a recorded image do not have a linear relation. Thus, the output γ correction processing for correcting an input gradation level of C, M, Y, and K multivalued data is performed in such a manner that the input gradation level of C, M, Y, and K 10-bit data and the density level of an image to be recorded at the gradation level becomes a linear relation.

Next, in step S404, color shift correction processing is performed. The reason why the color shift correction processing is performed in this step will be described. The one-dimensional LUT 403 used in the above-described output γ correction processing in step S403 is created for a recording head exhibiting standard recording characteristics. Nevertheless, as described above, due to an individual difference in the recording characteristics of the recording head 5 and the variation in injection amount from each nozzle, appropriate density correction cannot be performed on all the recording heads only by using an output γ correction table for correcting the recording head exhibiting standard recording characteristics. Thus, in step S404, the color shift correction processing is performed on the C, M, Y, and K multivalued data having been subjected to the output γ correction processing in step S403. In the present exemplary embodiment, based on density characteristics information acquired by the density characteristics acquisition processing to be described below with reference to FIG. 8, a color shift correction one-dimensional LUT (also referred to as a color shift correction table) is set.

Then, in step S405, quantization processing is performed. In this step, recording data indicating injection or non-injection of ink droplets from the recording head 5 is output by halftoning or index development using error diffusion or a dither pattern.

Next, the density characteristics acquisition processing, which is a characteristic configuration of the present exemplary embodiment, will be described with reference to FIGS. 8 to 11.

FIG. 8 is a flowchart illustrating the density characteristics acquisition processing to be automatically executed in the present exemplary embodiment. First, in step S801, an execution command of the density characteristics acquisition processing is input. Then, in step S802, the CPU 20a of the recording apparatus 200 drives the sheet feeding motor 24 to start the supply of the recording medium from the roll sheet holding unit or the sheet feeding position. If the recording medium P is conveyed up to the recording region and it is determined that image recording can be performed, in step S803, a patch pattern for acquiring recording characteristics of each nozzle is recorded on the recording medium P. The patch pattern is recorded by alternately performing a conveyance operation of the recording medium P in the Y direction and recording and scanning operations by the carriage in the X direction by driving the carriage motor 23. The patch pattern includes patches in a plurality of gradations for each ink color. Because the recording head 5 according to the present exemplary embodiment includes one nozzle array for each of the ink colors of C, M, Y, and K, the patch pattern includes the patches in the plurality of gradations for each of the four colors. A recording head that includes a plurality of nozzle arrays for one color may be configured to record a gradation patch for each nozzle array, or may be configured to record a gradation patch for each ink color. Alternatively, a patch may be recorded for each of the four ink colors, or a patch may be recorded for the four colors.

Next, in step S804, to dry the recorded patch pattern, the count of a dry timer is started to wait for a predetermined time. In step S805, using the green LED 205, the blue LED 206, and the red LED 207 of the multipurpose sensor 102, reflected intensity of a blank region (hereinafter, referred to as a white level) of a recording medium for which the patch pattern is not recorded is measured. A measurement result of the white level is used as a reference value in calculating a density value of the patch pattern to be recorded subsequently. The value of the white level is held for each of the LEDs. With respect to the density of the blank region of the recording medium, a background color is white if the recording medium is a white recording medium. In the present exemplary embodiment, the description will be given of an example of using a recording medium with a white background color.

In step S806, it is determined whether the counter of the dry timer indicates that a predetermined time has elapsed. If it is determined that the predetermined time has elapsed (YES in step S806), the processing proceeds to step S807. In step S807, the reflected intensity of the patch pattern is measured. The reflected intensity is measured by lighting an LED suitable for an ink color to be measured among the LEDs 205 to 207 included in the multipurpose sensor 102 and by reading reflected light using the phototransistors 203 and 204. The green LED 205 is lit, for example, when a patch pattern recorded using magenta ink and the blank region are measured. In a similar manner, the blue LED 206 is lit, for example, when a patch pattern recorded using yellow ink or black ink and the blank region are measured. The red LED 207 is lit, for example when a patch pattern recorded using cyan ink and the blank region are measured.

If the measurement of the reflected intensity of the patch pattern ends, in step S808, based on each patch pattern and an output value of the white level, the density value of the patch pattern is calculated for each corresponding nozzle. The calculated density value is stored in the memory 306 or the RAM 20b in the recording apparatus 200 as density characteristics information for setting the above-described color shift correction one-dimensional LUT in step S404. As for the ink color for which the green LED 205 is used to read a patch pattern, an output value of a white level read by the green LED 205 is used. In a similar manner, as for the ink color for which the blue LED 206 is used to read a patch pattern, an output value of a white level read by the blue LED 206 is used. As for the ink color for which the red LED 207 is used to read a patch pattern, an output value of a white level read by the red LED 207 is used.

When the reflected intensity of the blank region is 100%, the density value is calculated by multiplying the reflected intensity of a patch by a logarithm. For example, a density value ODm of a patch pattern recorded using magenta ink is calculated by the following formula, where a white level read using the green LED 205 is denoted by Gw, and a patch read value is denoted by Gm.

$$ODm = -\log(Gm/Gw) \quad (1)$$

In step S809, the recording medium P is discharged. In step S810, it is determined whether the density characteristics acquisition processing has normally ended. If it is determined that the density characteristics acquisition processing has not normally ended (NO in step S810), the processing ends. If it is determined that the density characteristics acquisition processing has normally ended (YES in step S810), the processing proceeds to step S811.

In step S811, the recording medium at a current feeding port is checked. The current feeding port is information indicating a feeding port of the recording medium fed onto the platen. Information indicating whether the recording medium is fed from the feeding port of the upper roll holding unit or that of the lower roll holding unit is stored in a memory as the current feeding port when the recording medium is fed. The current feeding port is rewritten when the recording medium is switched. The current feeding port is rewritten also when a received recording job includes information designating the feeding port and the recording medium is switched. In the present exemplary embodiment, the current feeding port is stored in the RAM 20b. If the current feeding port corresponds to the upper roll holding unit (YES in step S811), the processing proceeds to step S812. In step S812, a "sheet-set state executed flag (upper roll holding unit)" of the recording medium is set to "executed". On the other hand, if the current feeding port corresponds to the lower roll holding unit (NO in step S811), the processing proceeds to step S813. In step S813, a "sheet-set state executed flag (lower roll holding unit)" of the recording medium is set to "executed". Then, in step S814, an execution suspension flag of the density characteristics acquisition processing of the recording medium is set to "OFF", and the execution processing ends.

The execution suspension flag of the density characteristics acquisition processing is set to "ON" in a case where it is determined that the density characteristics acquisition processing is to be executed, such as a case where the density characteristics acquisition processing has not been executed, or a case where the previous execution of the density characteristics acquisition processing has failed. In addition, the execution suspension flag of the density characteristics acquisition processing is set to "ON" also in a case where a predetermined time has elapsed from the previous execution of the density characteristics acquisition processing, as "other conditions" of automatic execution conditions of the density characteristics acquisition processing, which will be described below.

The color shift correction table may be generated in the density characteristics acquisition processing.

The density characteristics acquisition processing and the type of recording medium will be described. A plurality of types of recording media includes a type having a large variation in measurement results obtained by recording or measuring a patch pattern for acquiring density characteristics, for example. In addition, in the case of measuring a patch pattern using a method of detecting a reflected light amount, some types of recording media such as a colored recording medium and a transparent medium obtain less-accurate measurement results. Thus, an appropriate measurement result is not always obtainable by the density characteristics acquisition processing for all types of recording media. Hereinafter, a recording medium for which an appropriate result is obtainable is referred to as a recording medium adequate for the density characteristics acquisition processing.

The recording apparatus 200 according to the present exemplary embodiment can execute two types of density characteristics acquisition processing including "common density characteristics acquisition processing" and "individual density characteristics acquisition processing". Then, recording media on which correction processing is executable can be classified into three types including "common density characteristics acquisition processing supported", "individual density characteristics acquisition processing supported", and "density characteristics acquisition processing unsupported". A table indicating classification of a correspondence relationship between information about the type of recording media and executability of the density characteristics acquisition processing is stored in the RAM 20b.

First, a recording medium classified into the "common density characteristics acquisition processing supported" is a recording medium of a type on which the common density characteristics acquisition processing is executable. If the common density characteristics acquisition processing is executable, density characteristics obtained by executing the density characteristics acquisition processing using a certain recording medium can be used not only for the color shift correction processing on a recording medium of the type, but also for the color shift correction processing on a recording medium of another type. The recording medium of the type is set as the "common density characteristics acquisition processing supported".

Next, a recording medium classified into the "individual density characteristics acquisition processing supported" is a recording medium of a type on which the individual density characteristics acquisition processing is executable. If the individual density characteristics acquisition processing is executable, it indicates that the density characteristics obtained by executing the density characteristics acquisition processing using a certain recording medium can be used only for the color shift correction processing on a recording medium of the type. A recording medium of a type unsuitable for the common density characteristics acquisition processing and a custom sheet correspond to the recording medium of such a type. The recording medium of the type is set as the "individual density characteristics acquisition processing supported".

Lastly, a recording medium classified into the "density characteristics acquisition processing unsupported" is a recording medium of a type on which neither the common density characteristics acquisition processing nor the individual density characteristics acquisition processing is executable. Because neither the common density characteristics acquisition processing nor the individual density characteristics acquisition processing is executable on the recording medium of the type, the recording medium of the type is set as the "density characteristics acquisition processing unsupported". In the color shift correction processing on the recording medium of the type set as the "density characteristics acquisition processing unsupported", density characteristics acquired using the recording medium of the type set as the "common density characteristics acquisition processing supported" are used.

Next, processing of determining whether to automatically execute the density characteristics acquisition processing in the recording apparatus 200 will be described.

TABLE 1

| Automatic execution condition | Condition | Setting value |
| --- | --- | --- |
| Sheet-set state | Sheet-set state | Execute/not execute |
| Other conditions | Elapsed time from previous execution of density characteristics acquisition processing | After "a" days |
| | The number of ink droplets injected from previous execution of density characteristics acquisition processing | "b" injected ink droplets |
| | When a parameter related to a recording medium is updated | Execute/not execute |

Using various switches provided on the host apparatus 100 or the operation panel 22, whether to automatically execute the density characteristics acquisition processing in the recording apparatus 200 can be set as an "automatic execution setting of density characteristics acquisition processing".

In addition, as an "automatic execution condition of the density characteristics acquisition processing", a condition for automatically executing the density characteristics acquisition processing (automatic execution condition) can be designated. As the automatic execution condition, the "sheet-set state" and "other conditions" can be set as indicated in Table 1.

As described above, the "sheet-set state" in the automatic execution condition in the processing refers to not only a state in which a recording medium is merely fed and the leading end of the recording medium is conveyed up to the sheet feeding position by setting the recording medium on a recording apparatus and executing a feeding operation, but also a state in which the type of recording medium is set in the recording apparatus 200. In other words, a state in which the recording medium of an identified type is conveyed up to the sheet feeding position and becomes ready for recording is the "sheet-set state" in the automatic execution condition. Since the density characteristics acquisition processing according to the present exemplary embodiment is executed for each type of recording medium, if the type of recording medium is not set, the state is not determined to be the "sheet-set state" of the automatic execution condition.

The "other conditions" include a case where a predetermined number of days ("a" days, where "a" is a natural number) have passed after the previous execution of the density characteristics acquisition processing, or a case where the number of ink droplets injected from a recording head after the previous execution of the density characteristics acquisition processing has exceeded a predetermined number ("b" injected ink droplets, where b is a natural number). Furthermore, a case where a parameter related to the recording medium is updated may be designated by the user. Examples of the case where a parameter related to the recording medium is updated include a case where a recording mode, such as the number of times a recording head is moved when an image is recorded on the recording medium, is changed, a case where a distance between a recording head and the recording medium is changed, and a case where a recording condition related to color, such as an image processing parameter, is updated.

These automatic execution conditions may be designated for each type of recording medium, or the same condition may be designated irrespective of the type of recording medium. In addition, the recording medium on which the density characteristics acquisition processing is to be automatically executed may be limited to a roll sheet. This is because the cut sheet is expected to be fed by the user not for the purpose of color shift correction but for the purpose of image recording. Aside from these cases, a case where the automatic execution condition is not designated, such as a timing at which a recording head is replaced or the time when the color shift correction processing is reset to a factory default state of a recording apparatus, may be set as the condition for automatically executing the density characteristics acquisition processing.

In addition, in a case where the "sheet-set state" is designated as the automatic execution condition, if the configuration is such that the recording medium is frequently switched and used, the density characteristics acquisition processing is executed each time the recording medium is fed. However, in this case, a time required for acquiring the density characteristics, and costs of recording media and ink may be excessive.

In contrast to this, in the recording apparatus 200 according to the present exemplary embodiment, a period of time for suspending automatic execution is set. For example, if the suspended period is set to one day, i.e., 24 hours, it is determined whether 24 hours have passed from the previous execution of the density characteristics acquisition processing. If 24 hours have not passed, it is determined that the density characteristics acquisition processing is not to be automatically executed. This can prevent the density characteristics acquisition processing from being executed too frequently. A threshold value for suspending the automatic execution is not limited to 24 hours. The threshold value may be defined by the number of injected ink droplets (injected number). When the density characteristics acquisition processing is to be automatically executed, the suspension period is provided before recording of a patch pattern is started, and the automatic execution may be canceled during the suspension period.

In addition, the method of the density characteristics acquisition processing is not limited to the method of measuring a recorded patch pattern, and the density characteristics may be acquired using another method. For example, the density characteristics may be acquired using a method of measuring an injection speed at which ink is injected from a recording head. Because the injection speed and the density of a recorded image are correlated, the density characteristics can be calculated from the injection speed. Alternatively, the density characteristics may be acquired using a method of acquiring the total number of ink droplets injected from a recording head. Because an injection amount variation attributed to wear of a recording head that is caused depending on the number of injected ink droplets, and the density of a recorded image are correlated, the density characteristics can be calculated from the total number of injected ink droplets. Alternatively, the density characteristics may be acquired using a method of acquiring a time from when ink is supplied to a recording head. Because an injection amount variation attributed to a swelled injection port that is caused depending on a time for which an injection port of a recording head is exposed to ink, and the density of a recorded image are correlated, the density characteristics can be calculated from the time from ink supply. Alternatively, the density characteristics may be acquired using a method of measuring an energy amount necessary for injection from a recording head. As a method of measuring the energy amount necessary for injection, a method called Pth control has been known. Because an ink injection amount obtained from the energy amount necessary for injection and the density of a recorded image are correlated, the density characteristics can be calculated from the energy amount necessary for injection.

Figure 9:
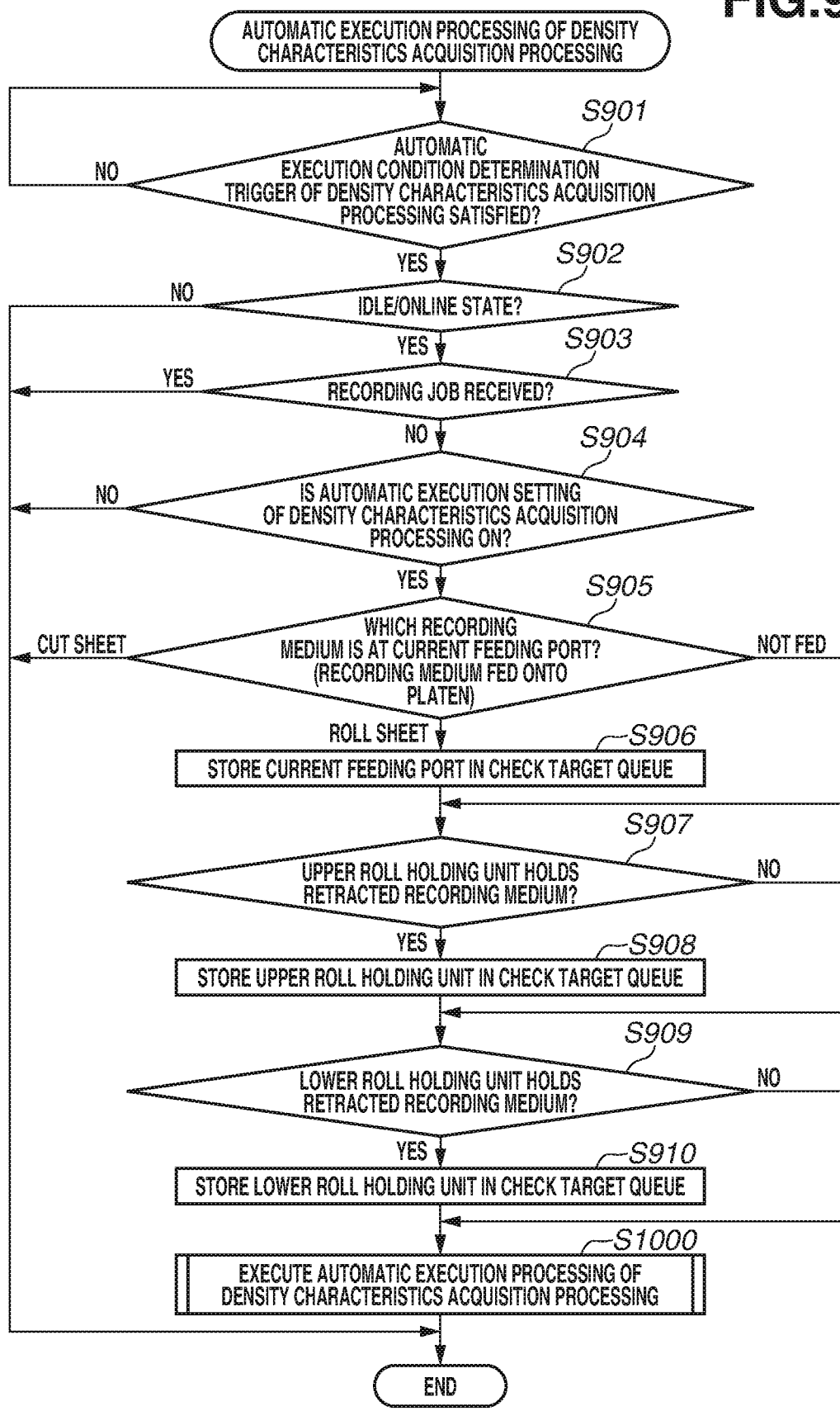
FIG. 9 is a flowchart illustrating an automatic execution processing of the density characteristics acquisition processing.

FIG. 9 is a flowchart illustrating processing of determining whether to automatically execute the density characteristics acquisition processing in the recording apparatus 200.

The following description will be given of an example in which the density characteristics acquisition processing is not automatically executed on the cut sheet.

First, in step S901, it is checked whether an automatic execution condition determination trigger of the density characteristics acquisition processing is satisfied. The automatic execution condition determination trigger refers to a timing at which whether to automatically execute the density characteristics acquisition processing is determined. Examples of the automatic execution condition determination trigger include the time when sheet-fed information indicating that a recording medium has been fed is acquired, the time when the power of a recording apparatus is turned on, the time when the recording apparatus returns from a sleep state, the time after a head is replaced, the time after the color shift correction processing is reset, the time after a parameter related to the recording medium is updated, and the time after an image is recorded. If the above-described trigger is not satisfied (NO in step S901), the processing ends. If the above-described trigger is satisfied (YES in step S901), the processing proceeds to step S902.

In step S902, it is determined whether the recording apparatus is in an idle/online state (processable state). If it is determined that the recording apparatus is not in the processable state (NO in step S902), the processing ends. If it is determined that the recording apparatus is in the processable state (YES in step S902), the processing proceeds to step S903. In step S903, it is determined whether the recording apparatus has received a recording job from the host apparatus 100. If it is determined that the recording apparatus has received a recording job (YES in step S903, the processing ends.

If it is determined in step S903 that the recording apparatus has not received a recording job (NO in step S903), the processing proceeds to step S904. In step S904, it is checked whether the "automatic execution setting of density characteristics acquisition processing" is set to ON. If the "automatic execution setting of density characteristics acquisition processing" is set to OFF (NO in step S904), the processing ends. If the "automatic execution setting of density characteristics acquisition processing" is set to ON (YES in step S904), the processing proceeds to step S905. In step S905, the recording medium at the current feeding port, i.e., the recording medium fed onto the platen, is checked. If the recording medium at the current feeding port is the cut sheet ("CUT SHEET" in step S905), the processing ends. If the recording medium is not fed to the current feeding port ("NOT FED" in step S905), the processing proceeds to step S907. If the recording medium at the current feeding port is the roll sheet ("ROLL SHEET" in step S905), the processing proceeds to step S906. In step S906, the current feeding port is stored in the RAM 20b in a check target queue to be described below in step S1001 and subsequent steps.

Next, in step S907, it is checked whether the upper roll holding unit holds a retracted recording medium. If the upper roll holding unit does not hold a retracted recording medium (NO in step S907), the processing proceeds to step S909. If the upper roll holding unit holds a retracted recording medium (YES in step S907), the processing proceeds to step S908. In step S908, the upper roll holding unit is stored in the check target queue to be described below in step S1001 and subsequent steps.

In a similar manner, in step S909, it is checked whether the lower roll holding unit holds a retracted recording medium. If the lower roll holding unit does not hold a retracted recording medium (NO in step S909), the processing proceeds to step S1000. If the lower roll holding unit holds a retracted recording medium (YES in step S909), the processing proceeds to step S910. In step S910, the lower roll holding unit is stored in the check target queue to be described below in step S1001 and subsequent steps.

Subsequently, in step S1000, loop processing of the automatic execution processing of the density characteristics acquisition processing is performed the number of times corresponding to the number of feeding ports stored in the check target queue in steps S905 to S910.

FIG. 10, which includes FIGS. 10A and 10B, is a flowchart illustrating the automatic execution processing of the density characteristics acquisition processing in step S1000.

In step S1001, the loop processing is started. In step S1002, information regarding the recording medium at the feeding port is acquired. The information regarding the recording medium includes information indicating whether the recording medium of the type is a recording medium on which the density characteristics acquisition processing is executable, the automatic execution setting of density characteristics acquisition processing, and an execution condition of the individual density characteristics acquisition processing.

In step S1003, it is determined whether the recording medium of the type is a recording medium on which the density characteristics acquisition processing is executable. In this step, if the type of fed recording medium is a type adequate for the execution of the common density characteristics acquisition processing or a type adequate for the execution of the individual density characteristics acquisition processing, the recording medium is determined to be a recording medium on which the density characteristics acquisition processing is executable. If the type of fed recording medium is a type on which the density characteristics acquisition processing is not executable (NO in step S1003), the processing proceeds to the next loop. If the type of fed recording medium is a type on which the density characteristics acquisition processing is executable (YES in step S1003), the processing proceeds to step S1004. In step S1004, it is checked whether the automatic execution setting of the density characteristics acquisition processing is set to ON for the recording medium of the type. If the automatic execution setting of the density characteristics acquisition processing is set to OFF (NO in step S1004), the processing proceeds to the next loop. If the automatic execution setting of the density characteristics acquisition processing is set to ON (YES in step S1004), the processing proceeds to step S1005.

In step S1005, it is checked whether the setting in the "sheet-set state" is set to "execute" or "not execute" as the automatic execution condition of the density characteristics acquisition processing for the recording medium of the type. If the setting in the "sheet-set state" is set to "not execute" as the automatic execution condition of the density characteristics acquisition processing (NO in step S1005), the processing proceeds to step S1009. If the setting in the "sheet-set state" is set to "execute" as the automatic execution condition of the density characteristics acquisition processing (YES in step S1005), the processing proceeds to step S1006.

In step S1006, it is checked whether the "sheet-set state executed flag" of the recording medium of the type is set to "executed". If the "sheet-set state executed flag" is set to "executed" (YES in step S1006), the processing proceeds to step S1009. If the "sheet-set state executed flag" is set to "unexecuted" (NO in step S1006), the processing proceeds to step S1007.

In step S1007, the current time and the previous execution time of the density characteristics acquisition processing on the recording medium of the type are acquired. Then, an elapsed time from the previous execution time is calculated, and it is determined whether the calculated elapsed time is smaller than or equal to a predetermined time. In the present exemplary embodiment, it is determined whether the calculated elapsed time is smaller than or equal to 24 hours. If it is determined that the elapsed time is longer than the predetermined time (NO in step S1007), the processing proceeds to step S1012. If it is determined that the elapsed time is shorter than or equal to the predetermined time (YES in step S1007), the processing proceeds to step S1008. In step S1008, the "sheet-set state executed flag" of the recording medium of the type is set to "executed".

Next, in step S1009, it is checked whether the execution condition is set to "other conditions" of the automatic execution condition of the density characteristics acquisition processing on the recording medium of the type. If the execution condition is not set to "other conditions" (NO in step S1009), the processing proceeds to the next loop. If the execution condition is set to "other conditions" (YES in step S1009), the processing proceeds to step S1010.

In step S1010, it is checked whether the execution condition set as the "other conditions" of the automatic execution condition of the density characteristics acquisition processing on the recording medium of the type is satisfied. If the set condition is not satisfied (NO in step S1010), the processing proceeds to the next loop. If the set condition is satisfied (YES in step S1010), the processing proceeds to step S1011.

In step S1011, it is checked whether the execution suspension flag of the density characteristics acquisition processing on the recording medium of the type is set to "suspended". If the execution suspension flag is set to "no suspension" (NO in step S1011), the processing proceeds to the next loop. If the execution suspension flag is set to "suspended" (YES in step S1011), the processing proceeds to step S1012.

Figure 11:
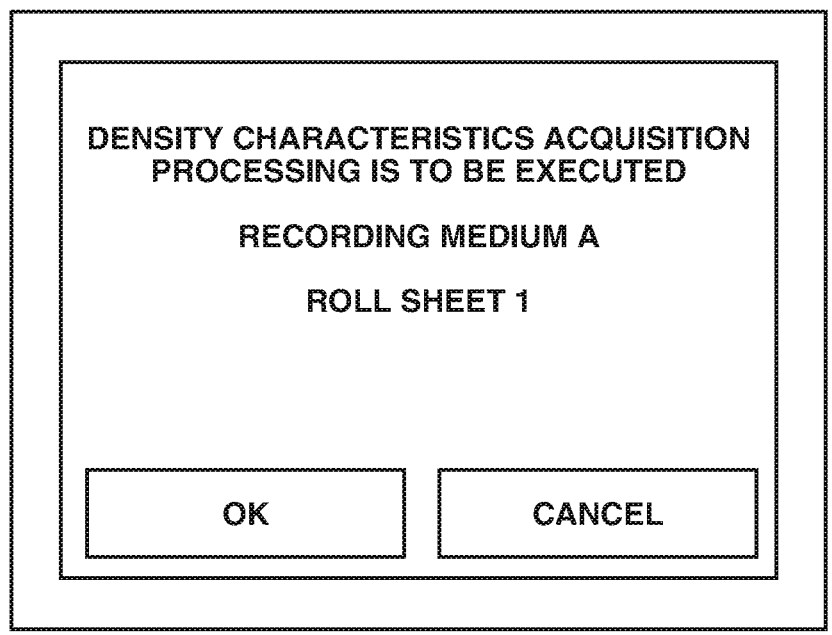
FIG. 11 is a diagram illustrating a message screen to be displayed on an operation panel.

In step S1012, a message screen indicating that the density characteristics acquisition processing is to be automatically executed is displayed via the operation panel 22 of the recording apparatus. FIG. 11 illustrates a message screen to be displayed on the operation panel 22. The message screen includes a message indicating that the density characteristics acquisition processing is to be executed, the name of the recording medium, information regarding the feeding port, an "OK" button, and a "cancel" button.

In step S1013, it is determined whether the "cancel" button has been pressed by the user. If the "cancel" button has been pressed (YES in step S1013), the processing proceeds to the next loop. If the "cancel" button has not been pressed (NO in step S1013), the processing proceeds to step S1014. In step S1014, it is determined whether the "OK" button has been pressed by the user. If the "OK" button has been pressed (YES in step S1014), the processing proceeds to step S1016. If the "OK" button has not been pressed (NO in step S1014), the processing proceeds to step S1015. In step S1015, it is determined whether five seconds have elapsed. The loop in steps S1013 to S1015 is repeated until five seconds elapse. After it is determined that five seconds have elapsed (YES in step S1015), the processing proceeds to step S1016. In step S1016, the density characteristics acquisition processing illustrated in FIG. 8 is executed using the recording medium of the type.

As described above, in the present exemplary embodiment, by determining the execution of the density characteristics acquisition processing at an appropriate timing, it is possible to appropriately set an execution frequency of the density characteristics acquisition processing while ensuring the color stability of the recording medium. This can contribute to a cost reduction related to the density characteristics acquisition processing and a reduction of a time during which a user image cannot be recorded. In addition, by appropriately performing the density characteristics acquisition processing on the recording medium adequate for execution of the common density characteristics acquisition processing, it is possible to ensure the color stability of the recording medium inadequate for the execution of the density characteristics acquisition processing. In particular, in the configuration in which a plurality of types of recording media is used while frequently switching the recording media, the automatic execution frequency of the density characteristics acquisition processing can be appropriately controlled.

In the present exemplary embodiment, the description has been given of the configuration in which the processing illustrated in the flowcharts in FIGS. 9 and 10 is executed in the recording apparatus 200, but a part or all of the processing may be executed in an information processing apparatus such as the host apparatus 100.

In addition, the inkjet recording apparatus that injects ink droplets has been described as the example of the recording apparatus 200 according to the present exemplary embodiment, but the present invention is not limited to this. The recording apparatus 200 is not limited to the inkjet recording apparatus as long as a difference in recording characteristics is caused in the recording apparatus that records an image by applying recording material to the recording medium. In place of ink, toner may be used as the recording material.

Thus, the configuration that applies the recording material is not limited to the recording head. In other words, the information processing apparatus according to the present invention may comprise a recording unit which may be a recording head (for example, such as the recording head 5 described above) or other configuration for applying the recording material.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A recording apparatus comprising:
one or more circuits;
one or more processors and at least one memory, the at least one memory being coupled to the one or more processors and having stored thereon instructions executable by the one or more processors, wherein at least one of the one or more circuits or the execution of the instructions causes the recording apparatus to function as:
a recording unit configured to record an image on a recording medium;
a setting unit configured to set a setting indicating whether, at a timing that the recording medium has been fed, an acquisition processing for acquiring recording characteristics of the recording unit is to be executed, wherein the acquisition processing includes recording a plurality of patch patterns each of which corresponds to a gradation among a plurality of gradations of ink colors, and acquiring read values by reading each of the plurality of patch patterns; and an execution unit configured to execute the acquisition processing based on the setting.

2. The recording apparatus according to claim 1, further comprising a memory configured to store the setting.

3. The recording apparatus according to claim 1, wherein the setting is set for each type of the recording medium.

4. The recording apparatus according to claim 1, wherein the setting is set by the setting unit at a timing before the recording medium is fed.

5. The recording apparatus according to claim 1, wherein in a case where the recording medium is fed at a predetermined position and a type of the recording medium is set, the execution unit determines that the recording medium is fed.

6. The recording apparatus according to claim 1,
wherein in a case where the execution unit determines that the recording medium is fed, the execution unit acquires the setting, and
wherein in a case where the acquired setting indicates execute the acquisition processing, the execution unit executes the acquisition processing.

7. The recording apparatus according to claim 1, wherein in a case where the setting indicates that the acquisition processing is to be executed but a predetermined time period is not lapsed from a previous acquisition processing of the acquisition processing, the execution unit does not execute the acquisition processing.

8. The recording apparatus according to claim 1, wherein in a case where the setting indicates that the acquisition processing is to be executed but a recording amount of the recording unit after execution of a previous acquisition processing of the acquisition processing is smaller than a threshold, the execution unit does not execute the acquisition processing.

9. The recording apparatus according to claim 8,
wherein the recording unit is an ink jet recording head configured to inject ink droplets, and
the recording amount is a number of injected ink droplets.

10. The recording apparatus according to claim 1, further comprising a receiving unit configured to receive information on the setting from a user.

11. A recording system comprising:
at least one processor; and
at least one memory coupled to the at least one processor, the at least memory having instructions that, when executed by the processor, causes the at least one processor to function as:
a recording apparatus and an information processing apparatus,
the recording apparatus including
a recording unit configured to record an image on a recording medium, and
an execution unit configured to execute an acquisition processing for acquiring recording characteristics of the recording unit,
the information processing apparatus including
a setting unit configured to set a setting indicating whether to execute, at a timing that the recording medium has been fed, the acquisition processing,
wherein the acquisition processing includes recording a plurality of patch patterns each of which corresponds to a gradation among a plurality of gradations of ink colors, and acquiring read values by reading each of the plurality of patch patterns, and wherein the execution unit executes the acquisition processing based on the setting set by the setting unit.

12. The recording system according to claim 11, wherein the recording apparatus includes a memory configured to store the setting.

13. The recording system according to claim 11, wherein the setting is set for each type of the recording medium.

14. The recording system according to claim 11, wherein the setting is set by the setting unit at a timing before the recording medium is fed.

15. The recording system according to claim 11, wherein in a case where the recording medium is fed at a predetermined position and a type of the recording medium is set, the execution unit determines that the recording medium is fed.

16. The recording system according to claim 11,
wherein in a case where the execution unit determines that the recording medium is fed, the execution unit acquires the setting, and
wherein in a case where the acquired setting indicates execute the acquisition processing, the execution unit executes the acquisition processing.

17. The recording system according to claim 11, wherein in the acquisition processing, the plurality of patch patterns, each of which corresponds to the gradation among the plurality of gradations of ink colors, are recorded, and a patch read value of the each patch pattern is acquired.

18. The recording system according to claim 11, wherein in a case where the setting indicates that the acquisition processing is to be executed but a predetermined time period is not lapsed from a previous acquisition processing of the acquisition processing, the execution unit does not execute the acquisition processing.

19. The recording system according to claim 11, wherein in a case where the setting indicates that the acquisition processing is to be executed but a recording amount of the recording unit after execution of a previous acquisition processing of the acquisition processing is smaller than a threshold, the execution unit does not execute the acquisition processing.

20. The recording system according to claim 19,
wherein the recording unit is an ink jet recording head configured to inject ink droplets, and
the recording amount is a number of injected ink droplets.

21. The recording system according to claim 11, wherein the information processing apparatus includes a receiving unit configured to receive information on the setting from a user.

22. A control method comprising:
setting in which a setting is set, wherein the setting indicates whether, at a timing that a recording medium has been fed, an acquisition processing for acquiring recording characteristics of a recording unit configured to record an image on a recording medium is to be executed, wherein the acquisition processing includes recording a plurality of patch patterns, each of which corresponds to a gradation among a plurality of gradations of ink colors, and acquiring read values by reading each of the plurality of patch patterns; and
performing an execution in which the acquisition processing is executed based on the setting set in the setting.

* * * * *